United States Patent
Chaturvedi et al.

(10) Patent No.: US 12,244,472 B2
(45) Date of Patent: Mar. 4, 2025

(54) METHOD AND NETWORK ENTITY FOR HANDLING KPI PM DATA

(71) Applicant: SAMSUNG ELECTRONICS CO., LTD., Suwon-si (KR)

(72) Inventors: Abhishek Chaturvedi, Bangalore (IN); Abhishek Shyamsundar Bhattad, Bangalore (IN); Varadarajan Seenivasan, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 381 days.

(21) Appl. No.: 17/840,494

(22) Filed: Jun. 14, 2022

(65) Prior Publication Data

US 2022/0329498 A1    Oct. 13, 2022

Related U.S. Application Data

(63) Continuation of application No. PCT/KR2020/019470, filed on Dec. 31, 2020.

(30) Foreign Application Priority Data

Jan. 3, 2020  (IN) .............. 202041000278
Dec. 28, 2020 (IN) .............. 202041000278

(51) Int. Cl.
*H04L 41/5009*    (2022.01)
*H04L 43/022*    (2022.01)
(Continued)

(52) U.S. Cl.
CPC ........ *H04L 41/5009* (2013.01); *H04L 43/022* (2013.01); *H04W 24/02* (2013.01); *H04W 24/10* (2013.01)

(58) Field of Classification Search
CPC ............ H04L 41/5009; H04L 43/022; H04W 24/02; H04W 24/10
See application file for complete search history.

(56) References Cited

U.S. PATENT DOCUMENTS

| 8,032,620 B2 | 10/2011 | Scott et al. |
| 2013/0304905 A1 | 11/2013 | Appachiappan et al. |

(Continued)

FOREIGN PATENT DOCUMENTS

| EP | 3383088 | 10/2018 |
| WO | 2018/162046 | 9/2018 |

(Continued)

OTHER PUBLICATIONS

India Office Action dated Feb. 17, 2022 for IN Application No. 202041000278.

*Primary Examiner* — Samina F Choudhry
(74) *Attorney, Agent, or Firm* — Nixon & Vanderhye P.C.

(57) ABSTRACT

The embodiments herein provide a method for reducing KPI data. The disclosed technique is used to reduce insignificant KPI data generated by network entities (NEs) such as Radio Access Network (RAN) or element management system (EMS)/network management system (NMS). Further, the method includes determining a threshold value for each KPI data to determine significance of the KPI data and uses the threshold value to reduce the KPI data in a file. Further, the method includes utilizing a network bandwidth (e.g., control plane traffic load) and a storage space in the EMS/operations support system (OSS) efficiently and helps operators of the EMS/OSS to identify a network KPI deterioration in near real time.

13 Claims, 4 Drawing Sheets

(51) Int. Cl.
*H04W 24/02* (2009.01)
*H04W 24/10* (2009.01)

(56)   References Cited

U.S. PATENT DOCUMENTS

| | | | |
|---|---|---|---|
| 2014/0068348 A1* | 3/2014 | Mondal | G06F 11/079 |
| | | | 714/45 |
| 2018/0143891 A1* | 5/2018 | Polisetty | G06F 9/542 |
| 2019/0007285 A1 | 1/2019 | Nevo et al. | |
| 2019/0138420 A1* | 5/2019 | Harutyunyan | G06F 11/301 |
| 2019/0163550 A1* | 5/2019 | Harutyunyan | G06F 11/3006 |
| 2020/0242000 A1* | 7/2020 | Khosrowpour | G06F 11/3608 |

FOREIGN PATENT DOCUMENTS

| | | |
|---|---|---|
| WO | WO2018162046 A1 | 9/2018 |
| WO | 2019/006018 | 1/2019 |
| WO | WO2019006018 A1 | 1/2019 |

* cited by examiner

METHOD AND NETWORK ENTITY FOR HANDLING KPI PM DATA

CROSS-REFERENCE TO RELATED APPLICATIONS

This application is a continuation of International Application No. PCT/KR2020/019470 designating the United States, filed on Dec. 31, 2020, in the Korean Intellectual Property Receiving Office and claiming priority to Indian Provisional Application No. 202041000278, filed on Jan. 3, 2020, in the Indian Patent Office, and to Indian Non-Provisional Patent Application No. 202041000278, filed on Dec. 28, 2020, in the Indian Patent Office, the disclosures of all of which are incorporated by reference herein in their entireties.

BACKGROUND

Field

The disclosure relates to telecommunication, and for example, is related to a method and network entity for handling key performance indicator (KPI) Performance Monitoring (PM) data.

Description of Related Art

In general, almost all kind of network elements (NEs) generate KPI data (e.g. call setup success rate, call drop rate, intra-frequency handover out success rate, inter-frequency handover out success rate, throughput, etc.) periodically as raw counters in autonomous messages (e.g. KPI events) or KPI files (e.g. comma-separated values (CSV) file, text (txt) file, etc.). The NEs may include any type of network element associated with a network such as a telecommunication network, a television network, a data network, a satellite communication network, and/or a cable system. For example, the NEs may be routers, gateways, hubs, evolved node B (eNodeB), gNodeB, and the like. Each NE generates millions of KPI data points in a typical day. For the network having thousands of NEs creates a big traffic load occurs between the NE and an element management system (EMS)/a network management system (NMS) of the network, and between the EMS/NMS and an operations support system (OSS) of the network. Furthermore, the EMS/NMS also generates the KPI data periodically for consumption by the OSS (uses the KPI data generated by the EMS/NMS). The EMS/NMS/OSS captures and stores the generated KPI data for monitoring a performance of the network.

Due to large number of NEs in the network, a size of the KPI data has become enormous and the KPI data points are insignificant to convey certain meaningful information over time. Yet, a storage space required for storing the enormous KPI data and a latency in processing the enormous KPI data are major concerns to many NE manufacturers and service providers. Furthermore, the gNodeB has a significantly higher number of KPI data and even more scarcely separated data points than that of the eNodeB. Therefore, transferring and storing the KPI data associated with the gNodeB is expensive than that in the eNodeB.

Certain existing systems use encoding/decoding and compression/decompression techniques to reduce the expenses of transfer of the KPI data points and storage of the KPI data points. Examples of the techniques such as run-length encoding (RLE), data dictionary encoding, value encoding, bit packing, and the like. A disadvantage of these techniques is that a response time increases when these techniques are applied in real-time environments.

Certain existing systems use compression/decompression techniques can be applied in anyone the EMS system (e.g. LTE system manager (LSM), core system manager (CSM), small cell system manager (SSM), unified system manager (USM), or for that matter any NE where the KPI file(s) is getting produces For example, the LSM creates a gzip compressed file every 15 min, and the size of the gzip-compressed file is 50-60 MB. If there are 700+ LSM blades in the network then the size of the gzip compressed file transferred to the OSS every 15 minutes is 55 MB*700=38.5 GB. There is a huge traffic load while transferring the files to the OSS. When the gzip file is uncompressed for processing, the size of the CSV files is 750-800 MB. The total file size for the OSS to handle every 15 min will be, 775 MB*700=542.5 GB. Therefore, the time taken to process this humongous amount of data is huge and burns down the storage space as well. Thus, aforementioned existing systems may lead to a delay in an identification of KPI degradations in the real-time environments. When the network is heavily loaded, the network might lead to loss of critical events reaching the EMS/NMS/OSS. In the case of EMS (LSM/CSM/SSM), there is a cap on a maximum number of cells or NEs that it can handle (EMS's capacity, maximum number of cells or NEs can be managed by the EMS at a time). The cap generally occurs due to a quantity of data associated with EMS (LSM/CSM/SSM) for downloads and processes. Compression will lead to an increase in EMS capacity.

Certain existing systems use the encoding/decoding techniques can be applied by column-based data encoding for a large-scale data storage that describes a column-based data encoding, where raw data to be compressed is organized by columns, and then, perform one or more encoding techniques on each column to compress data. Which work facilitates efficient data access operations (querying large-scale data) but is not suitable for handling the KPI data in the real-time environments in the network. Furthermore, data imputation techniques such as missing value imputation for predictive models describe imputing missing values for each of one or more predictor variables, which is not suitable for handling the KPI data in the real-time environments in the network Currently, there is no mechanism in the existing systems to address the above-mentioned problems. Accordingly, a solution is desired to reduce the expenses of transfer (network bandwidth between the NE and the EMS/NMS or between the EMS/NMS and the OSS) and storage (by EMS/NMS/OSS) of the KPI data in the network.

SUMMARY

Embodiments of the disclosure provide a method and network entity for handling KPI data in a telecommunication network.

Embodiments of the disclosure generate a file having most significant KPI data points by removing insignificant KPI data points based on a dynamic threshold value which causes a reduction in a file size, where the dynamic threshold value is defined by a NE for each KPI (PM) counter using a machine learning model (ML model). The file can be at least one of a CSV file, a spreadsheet report, a visualization, a text file, an executable file, etc.

Embodiments of the disclosure utilize a network bandwidth usage (e.g. control plane traffic load), increase a file transferring speed between the NE and an EMS/NMS or between the EMS/NMS and an OSS, and reduce a storage space of the KPI data points in the telecommunication network (e.g. EMS/NMS/OSS) by reducing a total number of KPI data points without compromising much on an accuracy of information conveyed by original KPI data points.

Embodiments of the disclosure identify degradation of the KPI data in near real-time environments and use files with smaller file size to eliminate a loss of important events accessing at the EMS/NMS/OSS during a high load in the network.

Accordingly, example embodiments herein provide a method for handling KPI data in a telecommunication network. The method includes: periodically monitoring, by a network entity (NE), a plurality of key performance indicator (KPI) data generated by a plurality of NEs in the telecommunication network; determining, by the NE, whether a difference between a current KPI data (generated KPI data) from the plurality of KPI data and corresponding previously obtained KPI data from the plurality of KPI data is greater than a threshold value ($\Delta t$; generating a file, where the file comprises the current KPI data in response to determining that the difference between the current KPI data from the plurality of KPI data and corresponding the previously obtained KPI data from the plurality of KPI data is greater than the threshold value; generating the file, where the file comprises an empty field in response to determining that the difference between the current KPI data from the plurality of KPI data and corresponding the previously obtained KPI data from the plurality of KPI data is lower than the threshold value, where the empty field causes a reduction in a file size.

The method may further include: transferring the file from the plurality of NEs to an element management system/network management system (EMS/NMS) or the EMS/NMS to an operations support system (OSS; identifying, by the NE, real-time performance degradation of the telecommunication network based on the transferred file, and recovery of the performance degradation of the telecommunication network using the transferred file.

In an example embodiment, the KPI data are a set of many time series and each time series represents one KPI performance monitoring (PM) counter. Each KPI (PM) counter signifies a performance measurement taken at successive equally spaced points in a time for each NE, where each point is referred to as KPI (PM) data point.

In an example embodiment, the empty fields represent a value of the current KPI data is the same as the previously obtained KPI data.

In an example embodiment, the threshold value is defined by the NE for each KPI (PM) counter using a machine learning model (ML model).

The method may further include: periodically collecting, by the NE, the KPI data from the plurality of NEs; organizing, by the NE, the collected KPI data into time series; generating, by the NE, a KPI event for each KPI (PM) data points based on the difference between the current KPI data from the plurality of KPI data and corresponding the previously obtained KPI data from the plurality of KPI data being greater than the threshold value; configuring, by the network entity, the threshold value for each KPI (PM) counter; updating, by the network entity, a value of a last generated timestamp for each KPI (PM) counter in the file. The last generated time stamp controls synchronization between the NE and one of the EMS and the NMS.

In an example embodiment, the network entity comprises at least of the EMS, the NMS, and the plurality of NEs. The reduced size of the file effectively reduces a bandwidth usage of the telecommunication network, increases transferring speed of the file between the NE and the at least one of the EMS and the NMS, and between the at least one of the EMS and the NMS and the OSS. The reduced size of the file effectively reduces a storage space of the plurality of KPI data in the telecommunication network.

The example method may further include: utilizing network bandwidth (e.g., control plane traffic load) and the storage space in the EMS/OS S efficiently and helps operators of the EMS/OSS to identify KPI deterioration in near real-time. Further, the method includes reducing the loss of critical events while the bandwidth of the telecommunication networks loaded with heavy KPI data.

Accordingly, the example embodiments herein provide the network entity for providing a location-based articles. The network entity includes a KPI controller coupled with a processor and a memory. The KPI controller is configured to periodically monitor the plurality of KPI data generated by the plurality of NEs in the telecommunication network. Further, the KPI controller is configured to determine whether a difference between the current KPI data from the plurality of KPI data and corresponding previously obtained KPI data from the plurality of KPI data is greater than the threshold value ($\Delta t$). Further, the KPI controller is configured to generate the file, where the file comprises the current KPI data in response to determining that the difference between the current KPI data from the plurality of KPI data and corresponding the previously obtained KPI data from the plurality of KPI data is greater than the threshold value. Further, the KPI controller is configured to generate the file, where the file comprises an empty field in response to determining that the difference between the current KPI data from the plurality of KPI data and corresponding the previously obtained KPI data from the plurality of KPI data is lower than the threshold value, where the empty field causes a reduction in the file size. Further, the KPI controller is configured to transfer the file to the OSS of the telecommunication network. Further, the KPI controller is configured to identify the real-time performance degradation of the telecommunication network based on the transferred file and recovery of the performance degradation of the telecommunication network using the transferred file.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments herein without departing from the spirit thereof, and the embodiments herein include all such modifications.

According to various example embodiments of the disclosure, the example embodiments can increase a file transferring speed between the NE and an EMS/NMS or between the EMS and an OSS.

According to various example embodiments of the disclosure, the example embodiments can reduce a storage space of the KIP data points in the telecommunication network.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
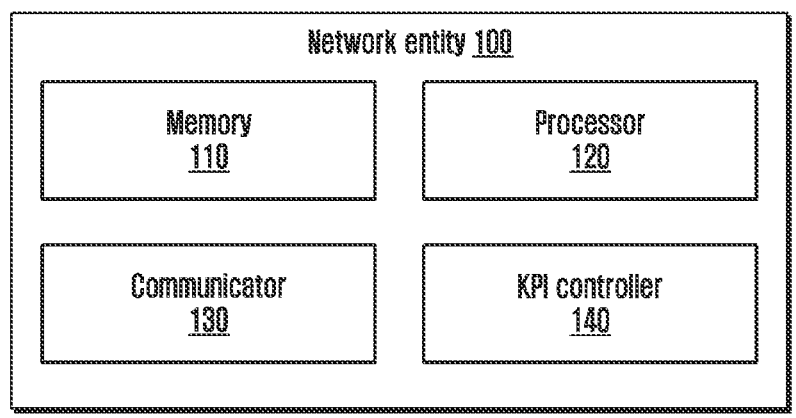
FIG. 1A is a block diagram illustrating an example configuration of a network entity for handling KPI data in a telecommunication network, according to various embodiments.

The example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the various example embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be understood to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the various example embodiments herein provide a method for handling KPI data in a telecommunication network. The method includes periodically monitoring, by a network entity, a plurality of KPI data generated by a plurality of NEs in the telecommunication network. Further, the method includes determining, by the network entity, whether a difference between a current KPI data from the plurality of KPI data and corresponding previously obtained KPI data from the plurality of KPI data is greater than a threshold value ($\Delta t$). Further, the method includes generating a file, where the file comprises the current KPI data in response to determining the difference between the current KPI data from the plurality of KPI data and corresponding the previously obtained KPI data from the plurality of KPI data is greater than the threshold value. Further, the method includes generating the file, where the file comprises an empty field in response to determining that the difference between the current KPI data from the plurality of KPI data and corresponding the previously obtained KPI data from the plurality of KPI data is lower than the threshold value, where the empty field causes a reduction in the file size. Further, the method includes transferring the file from the plurality of NEs to an EMS/NMS or the EMS/NMS to an OSS. Further, the method includes identifying, by the network entity, real-time performance degradation of the telecommunication network based on the transferred file, and recovery of the performance degradation of the telecommunication network using the transferred file.

Accordingly, various example embodiments herein provide the network entity for providing a location based articles. The network entity includes a KPI controller coupled with a processor and a memory. The KPI controller is configured to periodically monitor the plurality of KPI data generated by the plurality of NEs in the telecommunication network. Further, the KPI controller is configured to determine whether the difference between the current KPI data from the plurality of KPI data and corresponding previously obtained KPI data from the plurality of KPI data is greater than the threshold value ($\Delta t$). Further, the KPI controller is configured to generate the file, where the file comprises the current KPI data in response to determining that the difference between the current KPI data from the plurality of KPI data and corresponding the previously obtained KPI data from the plurality of KPI data is greater than the threshold value. Further, the KPI controller is configured to generate the file, where the file comprises an empty field in response to determining that the difference between the current KPI data from the plurality of KPI data and corresponding the previously obtained KPI data from the plurality of KPI data is lower than the threshold value, where the empty field causes the reduction in the file size. Further, the KPI controller is configured to transfer the file to the OSS of the telecommunication network. Further, the KPI controller is configured to identify real-time performance degradation of the telecommunication network based on the transferred file and recovery of the performance degradation of the telecommunication network using the transferred file.

Unlike existing methods and systems, the disclosed method and the network entity can be used to generate the file having most significant KPI data points by removing insignificant KPI data points based on the dynamic threshold value which causes a reduction in the file size, where the dynamic threshold value is defined by a NE for each KPI (PM) counter using a ML model.

Unlike existing methods and systems, the disclosed method and the network entity can be used to utilize a network bandwidth usage (e.g. control plane traffic load), increase a file transferring speed between the NE and the EMS/NMS or between the EMS/NMS and the OSS, and reduce a storage space of the KPI data points in the network (e.g. EMS/NMS/OSS) by reducing a total number of KPI data points without compromising much on accuracy of information conveyed by original KPI data points.

Unlike existing methods and systems, the disclosed method and the network entity can be used to identify degradation of the KPI data in near real-time environments and use a smaller file size for eliminating a loss of important events accessing at the EMS/NMS/OSS during a high load in the network.

Referring now to the drawings, and more particularly to FIGS. 1A, 1B, 2 and 3, where similar reference characters denote corresponding features consistently throughout the figures, there are shown various example embodiments.

Figure 3:
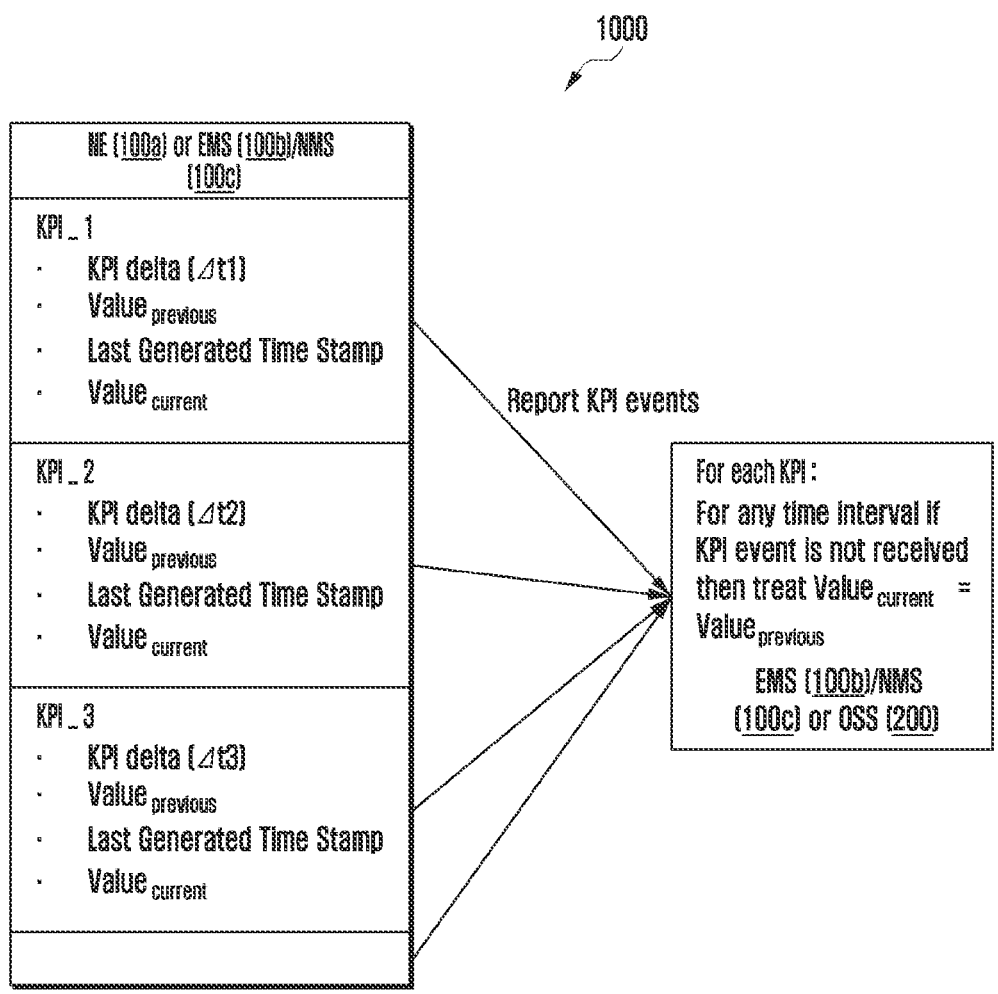
FIG. 3 is a diagram illustrating an example KPI event scenario in the telecommunication network, according to various embodiments.

FIG. 1A is a block diagram illustrating an example configuration of a network entity (100) for handling KPI data in a telecommunication network (1000), refer to FIG. 3), according to an various embodiments. The network entity (100) can be, for example, but not limited, to routers, gateways, hubs, central offices (COs), service switching points (SSP), soft switches, signal transfer points (STPs), service control points (SCPs), service nodes (SNs), service package applications (SPAs), mobile switching centres (MSCs), home location registers (HLRs), visitor location registers (VLRs), server offices, server switches, feature servers, application program interfaces (APIs), bridges, servers, set-top boxes (STBs), digital video recorders (DVRs), computers, base station (BS), evolved node B (eNodeB), gNodeB, element management system (EMS) and network management system (NMS), radio access network (RAN), core network (CN) and the like.

In an embodiment, the network entity (100) includes a memory (110), a processor (e.g., including processing circuitry (120), a communicator (e.g., including communication circuitry) (130), and a KPI controller (e.g., including processing and/or control circuitry) (140).

In an embodiment, the memory (110) is configured to store a plurality of KPI data (e.g. call setup success rate, call drop rate, throughput, etc.) generated by a plurality of NEs (100a) (e.g. eNodeB, gNodeB, etc.) in the telecommunication network (1000) and a threshold value (Δt) for each KPI data (numeric, alpha numeric or signal values). The memory (110) stores instructions to be executed by the processor (120).

The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the network entity (100), a cloud storage, or any other type of external storage.

In an embodiment, the processor (120) may include various processing circuitry and communicates with the memory (110), the communicator (130), and the KPI controller (140). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator (130) may include various communication circuitry and is configured for communicating internally between internal hardware components and with external devices (e.g. EMS (100b), NMS (100b), and OSS (200)) via one or more networks. The communicator (130) includes an electronic circuit specific to a standard that enables wired or wireless communication.

In an embodiment, the KPI controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the KPI controller (140) is configured to periodically monitor the plurality of KPI data generated by the plurality of NEs (100a) in the telecommunication network (1000). The KPI data are set of many time series and each time series represents one KPI performance monitoring (PM) counter. Each KPI (PM) counter signifies a performance measurement taken at successive equally spaced points in a time for each NE (100a), where each point is referred to as KPI (PM) data point. Further, the KPI controller (140) is configured to determine whether a difference between a current KPI data from the plurality of KPI data and corresponding previously obtained KPI data from the plurality of KPI data is greater than a threshold value (Δt). The threshold value is defined by the NE (100a) for each KPI (PM) counter using a ML model.

Further, the KPI controller (140) is configured to generate a file, where the file comprises the current KPI data in response to determining that the difference between the current KPI data from the plurality of KPI data and corresponding the previously obtained KPI data from the plurality of KPI data is greater than the threshold value. Further, the KPI controller (140) is configured to generate the file, where the file comprises an empty field in response to determining that the difference between the current KPI data from the plurality of KPI data and corresponding the previously obtained KPI data from the plurality of KPI data is lower than the threshold value, where the empty field causes a reduction in a file size. The empty fields represent a value of the current KPI data is the same as the previously obtained KPI data. The reduced size of the file cause reduces a bandwidth usage of the telecommunication network (1000), increase a transferring speed of the file between the NE (100a) and the at least one of the EMS (100b) and the NMS (100c), and between the at least one of the EMS (100b) and the NMS (100c) and the OSS (200). The reduced size of the file cause to reduce a storage space of the plurality of KPI data in the telecommunication network (1000).

Further, the KPI controller (140) is configured to transfer the file to the OSS (200) of the telecommunication network (1000). Further, the KPI controller (140) is configured to identify a real-time performance degradation of the telecommunication network (1000) based on the transferred file and recovery of the performance degradation of the telecommunication network using the transferred file.

Further, the KPI controller (140) is configured to generate a KPI event for each KPI data points when the difference between the current KPI data from the plurality of KPI data and corresponding the previously obtained KPI data from the plurality of KPI data is greater than the threshold value. The threshold value is automatically configured for each KPI (PM) counter by the each NE (100a) or the EMS (100b)/NMS (100c) at provisioning time or change them accordingly for better optimization.

Further, the KPI controller (140) is configured to update a value of a last generated timestamp for each KPI (PM) counter in the file. The last generated timestamp parameter helps to handle the KPI data re-sync scenario in case of a communication loss between the NE (100a) and the EMS (100b)/NMS (100c). Further, the KPI controller (140) is configured to store the parameter for each KPI data. After a communication recovery, the KPI controller (140) is configured to retrieve the parameter and compare the parameter with the value previously stored in the memory (110). If the retrieved timestamp for the KPI data is greater than the value previously stored, then re-sync only that KPI data points from the retrieved last generated timestamp value.

Although FIG. 1A shows various hardware components of the network entity (100) but it is to be understood that other embodiments are not limited thereon. In various embodiments, the network entity (100) may include less or more number of components. Further, the labels or names of the components are used only for illustrative purpose and does not limit the scope of the disclosure. One or more components can be combined together to perform same or substantially similar function to handle the KPI data in the telecommunication network (1000).

Figure 1B:
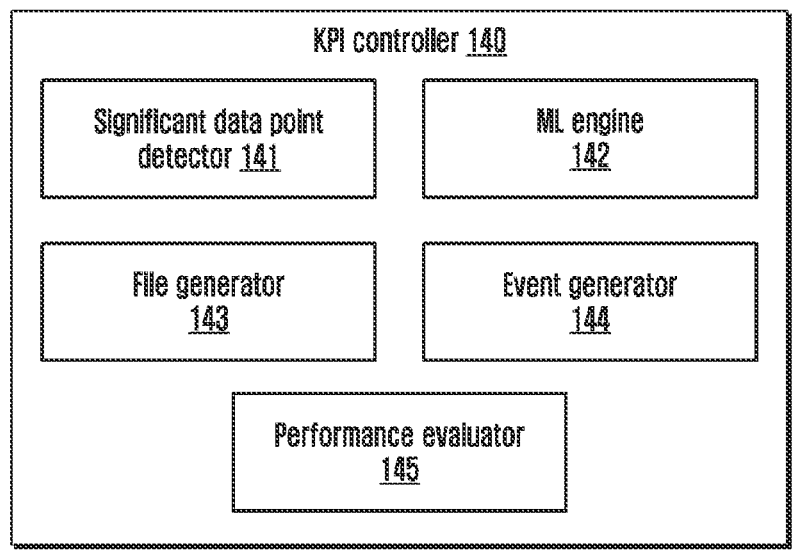
FIG. 1B is a block diagram illustrating an example configuration of a KPI controller for handling the KPI data in the telecommunication network, according to various embodiments.

FIG. 1B is a block diagram illustrating an example configuration of the KPI controller (140) for handling the KPI data in the telecommunication network (1000), according to an embodiment as disclosed herein.

In an embodiment, the KPI controller (140) includes a significant data point detector (141), an ML engine (142), a file generator (143), an event generator (144), and a performance evaluator (145). Each of these components may include various processing circuitry and/or executable program instructions.

In an embodiment, the significant data point detector (141) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the significant data point detector (141) periodically monitors the plurality of KPI data generated by the plurality of NEs (100a) in the telecommunication network (1000). Further, the significant data point detector (141) determines whether the difference between the current KPI data from the plurality of KPI data and corresponding the previously obtained KPI data from the plurality of KPI data is greater than the threshold value (Δt). The threshold value is defined by the NE (100a) for each KPI (PM) counter using the ML model (e.g., the ML engine (142)). Detail descriptions of the ML model(s) are given in FIG. 3. Further, the significant data point detector (141) periodically collects the KPI data from the plurality of NEs (100a) and organizes the collected KPI data into time series.

In an embodiment, the file generator (143) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the file generator (143) generates the file. Further, the file generator (143) transfers the file to the OSS (200) of the telecommunication network (1000). Where the plurality of NEs (100a) transfers the file to the EMS (100b)/NMS (100c) and/or the EMS (100b)/NMS (100c) transfers the file to the OSS (200).

In an embodiment, the event generator (144) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the event generator (144) generates the KPI event for each KPI data points when the difference between the current KPI data from the plurality of KPI data and corresponding the previously obtained KPI data from the plurality of KPI data is greater than the threshold value. The threshold value is automatically configured for each KPI (PM) counter by each NE (100a) or the EMS (100b)/NMS (100c) at provisioning time or change them accordingly for better optimization. Further, the event generator (144) updates the value of the last generated timestamp for each KPI (PM) counter in the file. The last generated timestamp parameter helps to handle the KPI data re-sync scenario in case of communication loss between the NE (100a) and the EMS (100b)/NMS (100c). Further, the event generator (144) stores the parameter for each KPI data. After the communication recovery, the event generator (144) retrieves the parameter and compares the parameter with the value previously stored in the memory (110).

In an embodiment, the performance evaluator (145) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the performance evaluator (145) identifies the real-time performance degradation of the telecommunication network (1000) based on the transferred file. Further, the performance evaluator (145) recovers the performance degradation of the telecommunication network (1000) using the transferred file.

The above described at least one of the plurality of modules/components may be implemented through an artificial intelligence (AI) model. A function associated with AI may be performed through memory (110) and the processor (120). The one or a plurality of processors controls the processing of the input data in accordance with a predefined operating rule or AI model stored in the non-volatile memory and the volatile memory. The predefined operating rule or artificial intelligence model is provided through training or learning.

Being provided through learning may refer, for example, to, by applying a learning process to a plurality of learning data, a predefined operating rule or AI model of a desired characteristic being made. The learning may be performed in a device itself in which AI according to an embodiment is performed, and/o may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may include a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 1B shows various hardware components of the KPI controller (140) but it is to be understood that other embodiments are not limited thereon. In various embodiments, the KPI controller (140) may include less or more number of components. Further, the labels or names of the components are used only for illustrative purpose and does not limit the scope of the disclosure. One or more components can be combined together to perform same or substantially similar function to handle the KPI data in the telecommunication network (1000).

Figure 2:
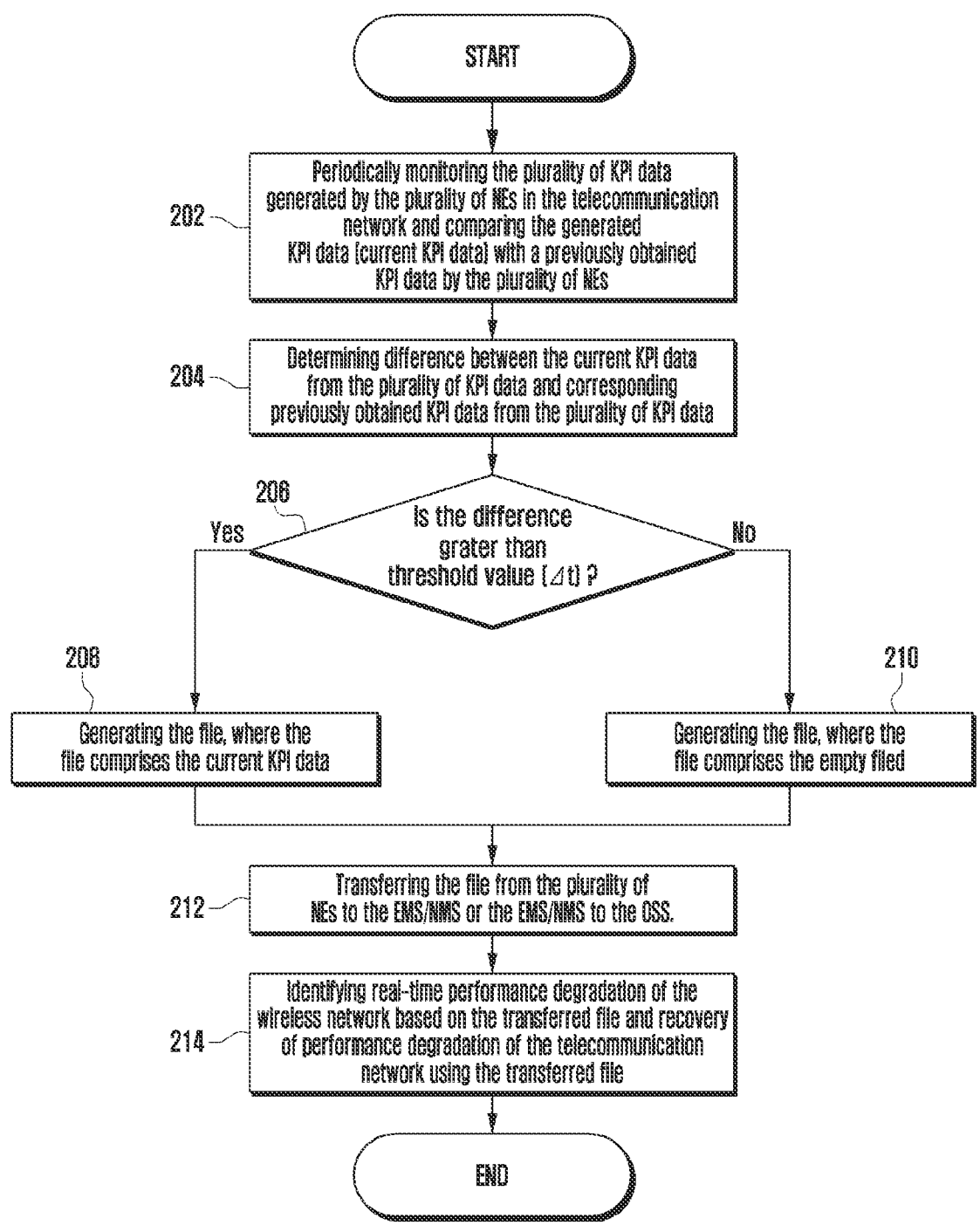
FIG. 2 is a flowchart illustrating an example method for handling the KPI data in the telecommunication network, according to various embodiments.

FIG. 2 is a flowchart illustrating an example method for handling the KPI data in the telecommunication network (1000), according to various embodiments.

At 202, the method includes periodically monitoring, by the significant data point detector (141), the plurality of KPI data generated by the plurality of NEs (100a) in the telecommunication network (1000) and comparing the generated KPI data (current KPI data) with a previously obtained KPI data by the plurality of NEs (100a).

At 204, the method includes determining, by the significant data point detector (141), the difference between the current KPI data from the plurality of KPI data and corresponding the previously obtained KPI data from the plurality of KPI data.

At 206, determining whether the difference is greater than the threshold value (Δt).

At 208, the method includes generating, by the file generator (143), the file, where the file comprises the current KPI data in response to determining that the difference between the current KPI data from the plurality of KPI data and corresponding the previously obtained KPI data from the plurality of KPI data is greater than the threshold value (Δt).

At 210, the method includes generating, by the file generator (143), the file, where the file comprises the current KPI data in response to determining that the difference between the current KPI data from the plurality of KPI data and corresponding the previously obtained KPI data from the plurality of KPI data is lower than the threshold value (Δt).

At 212, the method includes transferring, by the file generator (143), the file from the plurality of NEs (100a) to the EMS (100b)/NMS (100c) or the EMS (100b)/NMS (100c) to the OSS (200) (refer to FIG. 3).

At 214, the method includes identifying, by the performance evaluator (145), the real-time performance degradation of the telecommunication network (1000) based on the transferred file and recovery of the performance degradation of the telecommunication network (1000) using the transferred file.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

FIG. 3 is a diagram illustrating an example KPI event scenario in the telecommunication network (1000), according to various embodiments.

TABLE 1

| 0000-0015-PM_KPI.csv | | | | | |
|---|---|---|---|---|---|
| NE component | PM_counter_1 | PM_counter_2 | PM_counter_3 | PM_counter_4 | PM_counter_5 |
| ne_component_1 | 76.1 | 69.78 | 89.04 | 8.81 | 5 |
| ne_component_2 | 76.1 | 69.77 | 88.78 | 8.76 | 5 |
| ne_component_3 | 76.17 | 69.78 | 89.21 | 8.89 | 5 |
| ne_component_4 | 76.22 | 69.83 | 88.86 | 9.03 | 5 |
| ne_component_5 | 76.27 | 69.84 | 89.16 | 9.12 | 5 |
| ne_component_6 | 76.35 | 69.82 | 88.84 | 8.83 | 5 |

As depicted in Table 1, consider a scenario in which the NEs (100a) generate the KPI data (first KPI data/previously obtained KPI data/at previous time) as raw counters in autonomous messages (e.g. KPI events) or the KPI files (e.g., 0000-0015-PM_KPI.csv). The KPI data is a set of many time series (many sequences of discrete-time data). Each time series represents one KPI data or one PM counter (e.g. PM_counter_1). Each KPI data signifies some performance measurement for one NE component (100a) (e.g. ne_component_1) taken at the successive equally spaced points in time. Each point in KPI is referred to as the KPI data point. Referring to Table 1, the example shows sample data from the CSV file for five KPIs belonging to one KPI family (related KPIs belong to one family) For each KPI family, the NE (100a) (e.g. eNodeB) generates and transfers the file to the EMS (100b) every 15 minutes.

TABLE 2

| PM_counter | PM_counter_1 | PM_counter_2 | PM_counter_3 | PM_counter_4 | PM_counter_5 |
|---|---|---|---|---|---|
| Threshold (Δt) | 0.1 | 0.1 | 0.5 | 0.5 | 1 |

TABLE 3

| 0015-0030-PM_KPI.csv | | | | | |
|---|---|---|---|---|---|
| NE component | PM_counter_1 | PM_counter_2 | PM_counter_3 | PM_counter_4 | PM_counter_5 |
| ne_component_1 | 76.1 | 69.79 | 89.05 | 9.21 | 5 |
| ne_component_2 | 76.2 | 69.85 | 89.01 | 8.46 | 5 |
| ne_component_3 | 76.3 | 69.79 | 88.51 | 9.89 | 5 |
| ne_component_4 | 76.22 | 69.35 | 89.26 | 9.43 | 5 |
| ne_component_5 | 76.28 | 69.86 | 88.76 | 8.52 | 5 |
| ne_component_6 | 76.3 | 69.82 | 88.84 | 9.33 | 5 |

As depicted in Table 2, for each KPI data or PM counter, a parameter KPI delta (Δt) (e.g., threshold value) is defined to determine significance of the KPI data point. As depicted in Table 3, consider a scenario in which the NEs (100a) generate KPI data (second KPI data/at current (generation) time) as raw counters in the autonomous messages (e.g. KPI events) or KPI files (e.g., 0015-0030-PM_KPI.csv).

TABLE 4

| 0015-0030-PM_KPI.csv | | | | | |
|---|---|---|---|---|---|
| NE component | PM_counter_1 | PM_counter_2 | PM_counter_3 | PM_counter_4 | PM_counter_5 |
| ne_component_1 | empty | empty | empty | empty | empty |
| ne_component_2 | empty | empty | empty | empty | empty |
| ne_component_3 | 76.3 | empty | empty | 9.89 | empty |
| ne_component_4 | empty | 69.35 | empty | empty | empty |
| ne_component_5 | empty | empty | empty | 8.52 | empty |
| ne_component_6 | 76.3 | empty | empty | empty | empty |

As depicted in Table 4, the significant data point detector (141) determines whether the difference between the current KPI data from the plurality of KPI data and corresponding the previously obtained KPI data from the plurality of KPI data is greater than the threshold value (Δt). If the threshold value (Δt) is greater than the difference between the KPI data point at the current (generation) time and the KPI data points at the previous time, then only the file generator (143) (e.g. the NE (100a)) generates or saves the KPI data point in the file, otherwise simply ignore it, as shown in Table 4 and as per equation 1, $$|Value_{current} - Value_{previous}| > \Delta t \quad \text{Equation 1}$$

Where Value current denotes value of the KPI data point at the current (generation) time, and $Value_{previous}$ denotes the previous value of that KPI data point. If lots of repetition is seen for the KPI, then the KPI delta (Δt) for that KPI could be defined as zero or can be derived by unsupervised learning or statistical analysis of historical KPI data.

In FIG. 3, at any given point of time, if the equation 1 is satisfied for the KPI data point, then only the event generator (144) (e.g. the NE (100a)) generates the KPI event for that KPI data point. Also, the NE (100a) has a facility to set/configure the KPI delta (Δt) for each KPI data or the PM counter by the EMS (100b)/NMS (100c). Either the KPI deltas (Δt) for each KPI data can be auto-configured by the NE (100a) or the EMS (100b)/NMS (100c) can configure them at provisioning time or change them accordingly for better optimization. The 'Last Generated Time Stamp' parameter helps to handle the KPI data re-sync scenario in case of communication loss between the NE (100a) and the EMS (100b)/NMS (100c). The EMS (100a)/NMS (100b) stores the parameter for each KPI data. After the communication recovery, the EMS (100a)/NMS (100b) retrieves the parameter and compares the parameter with the value previously stored by the EMS (100a)/NMS (100b). If the retrieved timestamp for the KPI data is greater than the value previously stored in the EMS (100a)/NMS (100b), then re-sync only that KPI data points from the retrieved Last Generated Time Stamp value.

The disclosed method applies to the NEs (100a) and/or the EMS (100b)/NMS (100c) that generates the KPI data files at regular intervals (for example every 15 minutes, multiple CSV files including data of different KPIs). The disclosed method reduces the total file size by reducing insignificant KPI data points. The NE (100a) defines the KPI delta (Δt) for each KPI to determine significance of the KPI data point. At any given point of time, if equation 1 is satisfied for the KPI data point, then only put value in the KPI data file, otherwise, leave the field blank/empty (CSV files to have only most significant data points. Blank or empty fields reduces the size of CSV files).

Methods to decide the KPI delta (Δt) for each KPI data using the ML engine (142): the KPI delta (Δt) value for each KPI data can be decided manually, based on an experience of the NE (100a) and service providers. However, when the number of the KPI counter goes in hundreds and thousands, a manual work becomes cumbersome and practically impossible. Accordingly, the disclosed system uses the ML engine (142) to determine the KPI delta (Δt) automatically in the telecommunication network (1000).

Describing various examples/mechanisms to determine the KPI delta (Δt): unsupervised learning mechanism decides the KPI delta (Δt) value for each KPI data. The unsupervised learning method uses the K-means clustering method with an Elbow method. Following describes example method used:

a) Extracts and organizes the KPI data into time series (sequences of discrete-time data). Where each time series represents one KPI data signifying some performance measurement for one NE component (100*a*) taken at successive equally spaced points in time. For example, KPI data={V1, V2 ... Vn}, where Vx (x=[1, n]) represents vector having time series data of one KPI.

b) For each time series performs scaling operation the KPI data, Vscaled=(Vx−μx)/σx, where μx=Mean of values of Vx, and σx=Standard Deviation of values of Vx, and c) applies the elbow method on the scaled KPI data,
   a. For a range of number of clusters (K) (say 1 to 10), performs the k-means clustering on the scaled KPI data (Vscaled).
   b. Calculates R_square statistic for the clusters (K) and chooses number of the clusters (K) on the basis of the R_square, where the R_square is greater than or equal to a pre-decided optimal R_square value (e.g. 70%).
   c. Calculates a center of each cluster using original data, where the cluster is chosen clusters (K), Centers={C1, C2, ... CN}, where Cx (x=[1, N]) represents cluster centers.
   d. Calculates distance among each center of clusters and calculates the KPI delta (Δt) as mean of the calculated distances:
      i. Generate all possible pairs of two centers, all combinations of the elements of centers taken two at a time. E.g. (Cx, Cy) is one combination, Pairs={(C1, C2), (C1, C3) ... (C1, CN), (C2, C3), (C2, C4) ... (C2, CN) ... (CN−1, CN)}.
      ii. Calculate absolute difference between all possible pairs, all |Cx−Cy|. $V_{Distances}$={|C1−C2|, |C1−C3| ... |C1−CN|, |C2−C3|, |C2−C4| ... |C2−CN| ... |CN−1−CN|}, where VDistances is a vector of differences between pairs of Centers.
      iii. Calculate Δt value as mean of distances, Δt=Mean (VDistances), where Mean is standard procedure or method that calculates arithmetic mean of all values in a given vector R_square measures a fraction of a total sum of the squared distance between the KPI data points that can be explained by a sum of squared distance between the clusters. The clustering will be better when the fraction is higher. The R_square increases with the number of clusters (K). The Elbow method calculates the R_square as a function of the number of clusters, which helps in choosing the number of clusters such that adding another cluster does not give much better modelling of the KPI data. There are, for example, more complex alternatives to the Elbow method like using a Silhouette coefficient and a Bayesian Information Criterion (BIC) scores from a Gaussian Mixture Model (GMM) extension of the k-means. Visually discerning the Silhouette coefficient versus number of clusters graphs for each time series is not possible for this kind of the KPI dataset and the BIC method may be considered to be an overly complex model, whereas the Elbow method works work well if the KPI data is well clustered.

Statistical analysis mechanism to decide the KPI delta (Δt) value for each KPI data. The statistical analysis mechanism may, for example use a Douglas-Peucker method with a fixed number of points (half of total number of original points). The overall method used may:

a) Extract and organize the KPI data into time series (sequences of discrete-time data). Each time series represents one PM counter signifying some performance measurement for one NE component (100*a*) taken at successive equally spaced points in time. For example, KPI data={V1, V2 ... Vn}, where Vx (x=[1, n]) represents vector having time series data of one KPI.

b) For each time series (Vx): Executes the Douglas-Peucker method to find a simplified curve with fewer points. (The points given by the method are the most significant points), $V_{newTrajectory}$=Douglas-Peucker_NbPoints (Vx, length(Vx)/2) Where length is a standard procedure or method that calculates size of a vector, Douglas-Peucker_NbPoints is a standard procedure or method that executes Ramer-Douglas-Peucker algorithm (RDP) for reducing the number of points in a trajectory (given input vector) and gives a new trajectory having fewer point (given input points). $V_{newTrajectory}$={P1, P2 ... Pn}, where Px (x=[1, N]) represents most significant points in Vx.

c) Then, calculates the differences between the successive points found in previous step. (Most significant jumps), Vjumps={|P1−P2|, |P2−P3| ... |PN−1−PN|}, where Vjumps is a vector of differences successive points in Vnewtrajectory.

d) Calculates mean of jumps found in the previous step, uses the value as the KPI delta (Δt). Δt=Mean (Vjumps), Where Mean is standard procedure or method that calculates arithmetic mean of all values in a given vector.

Rudimentary mechanism, where keep the KPI delta (Δt)= 0. (Remove repeating data). Performance evaluation shows that the Unsupervised learning mechanism (K-means clustering) gives slightly better results than the statistical analysis (Douglas Peucker method) because former is an iterative method having each run independent of each other. Multiple runs of the K-means clustering can find different local optima, and this can help in choosing the global optimum value. The K-means clustering method begins with choosing K random cluster centres. Then the two steps of assignment and optimization continue iteratively until the clusters stop updating. This gives you the most optimal clusters the clusters with a minimum intra-cluster distance and a maximum inter-cluster distance.

However, the Douglas Peucker method is a recursive method and each recursive call is dependent on the curves derived by the parent caller. Compared to the K-means clustering the Douglas Peucker is minimizing/reducing intra-cluster distance but not necessarily maximizing inter-cluster distance. Thus, the Douglas Peucker may keep non-significant points on the simplified curve and may not gives most significant jumps as effectively as the K-means. In existing networks (legacy EMS (100*b*)/NMS (100*c*)/NE (100*a*)) with no possible support for big data technologies. Because of the above reasons the unsupervised learning mechanism (K-means clustering) is recommended.

The unsupervised learning may offer better results but the unsupervised learning is resource intensive process. The K-Means is an iterative method and updates centres with each iteration. The K-Means has high learning curve and highly dependent on training dataset. But if a big data environment with distributed processing of large data sets across clusters of computers is available then implementing technique the unsupervised learning is most beneficial for real time processing and learning. Experimentation to apply this technique in 5G networks at edge side can be analysed further. Edge computing is a distributed computing paradigm, so application of this technique could achieve real time reduction of insignificant KPI data. Also scaling and performance of this technique in a real time environment needs to be analysed further.

The various example embodiments disclosed herein can be implemented using at least one hardware device and performing network management functions to control the elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a network entity (NE) for handling key performance indicator (KPI) data in a telecommunication network, the method comprising:
   obtaining a plurality of KPI data generated by a plurality of NEs in the telecommunication network;
   identifying current KPI data and previous KPI data based on the plurality of KPI data;
   determining whether a difference between the current KPI data and the previous KPI data is greater than a threshold value;
   in accordance with a determination that the difference between the current KPI data and the previous KPI data is greater than the threshold value, transmitting a file comprising the current KPI data to an operations support system (OSS); and
   in accordance with a determination that the difference between the current KPI data and the previous KPI data is less than or equal to the threshold value, transmitting, a file comprising an empty field to the OSS,
   wherein the file comprising the empty field indicates that the current KPI data is same as the previous KPI data.

2. The method of claim 1, further comprising:
   identifying a performance degradation of the telecommunication network based on the file; and
   recovering the performance degradation of the telecommunication network using the file.

3. The method of claim 1, wherein the current KPI data include a set of many time series and each time series representing one KPI performance monitoring (PM) counter;
   wherein each KPI PM counter corresponds to a performance measurement taken at successive equally spaced points in a time for each NE, wherein each point comprises a KPI PM data point.

4. The method of claim 1, wherein the threshold value is defined by the NE for each KPI PM counter using a machine learning (ML) model.

5. The method of claim 1, further comprising:
   generating a KPI event for each KPI data point based on the difference between the current KPI data and the previous KPI data being greater than the threshold value;
   configuring the threshold value for each KPI PM counter; and
   updating a value of a last generated timestamp for each KPI PM counter in the file;
   wherein the last generated time stamp is used for a synchronization.

6. The method of claim 1, wherein obtaining the plurality of KPI data comprises:
   periodically collecting KPI data from the plurality of NEs; and
   organizing the collected KPI data into time series, wherein each time series represents one KPI data signifying a performance measurement for one NE component taken at successive equally spaced points in time.

7. The method of claim 6, wherein the threshold value is generated by:
   scaling the organized KPI data;
   performing k-means clustering on the scaled KPI data for a range of number of clusters;
   calculating a fraction of a total sum of the squared distance between KPI data points for the clusters;
   selecting a number of the clusters based on the calculation;
   calculating a center of each cluster, wherein the cluster comprises selected clusters; and
   determining a distance among each center of clusters and calculating a KPI delta as a mean of the calculated distances.

8. A network entity (NE) for handling key performance indicator (KPI) data in a telecommunication network, the NE comprising:
   a memory storing instructions;
   a processor comprising processing circuitry; and
   a communicator comprising communication circuitry,
   wherein the instructions, when executed by the processor, cause the NE to:
   obtain a plurality of KPI data generated by a plurality of NEs in the telecommunication network;
   identify current KPI data and previous KPI data based on the plurality of KPI data;
   determine whether a difference between the current KPI data and the previous KPI data is greater than a threshold value;
   in accordance with a determination that the difference between the current KPI data and the previous KPI data is greater than the threshold value, transmit a file comprising the current KPI data to an operations support system (OSS); and
   in accordance with a determination that the difference between the current KPI data and the previous KPI data is less than or equal to the threshold value, transmit a file comprising an empty field to the OSS,
   wherein the file comprising the empty field indicates that the current KPI data is same as the previous KPI data.

9. The NE of claim 8,
   wherein the instructions, when executed by the processor, cause the NE to:
   identify a performance degradation of the telecommunication network based on the file; and
   recover the performance degradation of the telecommunication network using the file.

10. The NE of claim 8, wherein the current KPI data include a set of many time series and each time series represents one KPI performance monitoring (PM) counter;

wherein each KPI PM counter includes a performance measurement taken at successive equally spaced points in a time for each NE, wherein each point includes a KPI PM data point.

11. The NE of claim 8, wherein the instructions, when executed by the processor, cause the NE to:

generate a KPI event for each KPI PM data point based on the difference between the current KPI data and the previous KPI data being greater than the threshold value;

configure the threshold value for each KPI PM counter; and update a value of a last generated timestamp for each KPI PM counter in the file;

wherein the last generated time stamp is used for a synchronization.

12. The NE of claim 8, wherein the instructions to obtain the plurality of KPI data, when executed by the processor, cause the NE to:

periodically collecting KPI data from the plurality of NEs; and organizing the collected KPI data into time series.

13. The NE of claim 12, wherein the threshold value is generated by:

scaling the organized KPI data;

performing k-means clustering on the scaled KPI data for a range of number of clusters;

calculating a fraction of a total sum of the squared distance between the KPI data points for the clusters;

selecting a number of the clusters based on the calculation;

calculating a center of each cluster, wherein the cluster includes selected clusters; and determining a distance among each center of clusters and calculating a KPI delta as a mean of the calculated distances.

\* \* \* \* \*